(Model.)
M. BARNES.
CORN PLANTER CHECK ROWER.
No. 279,119. Patented June 12, 1883.
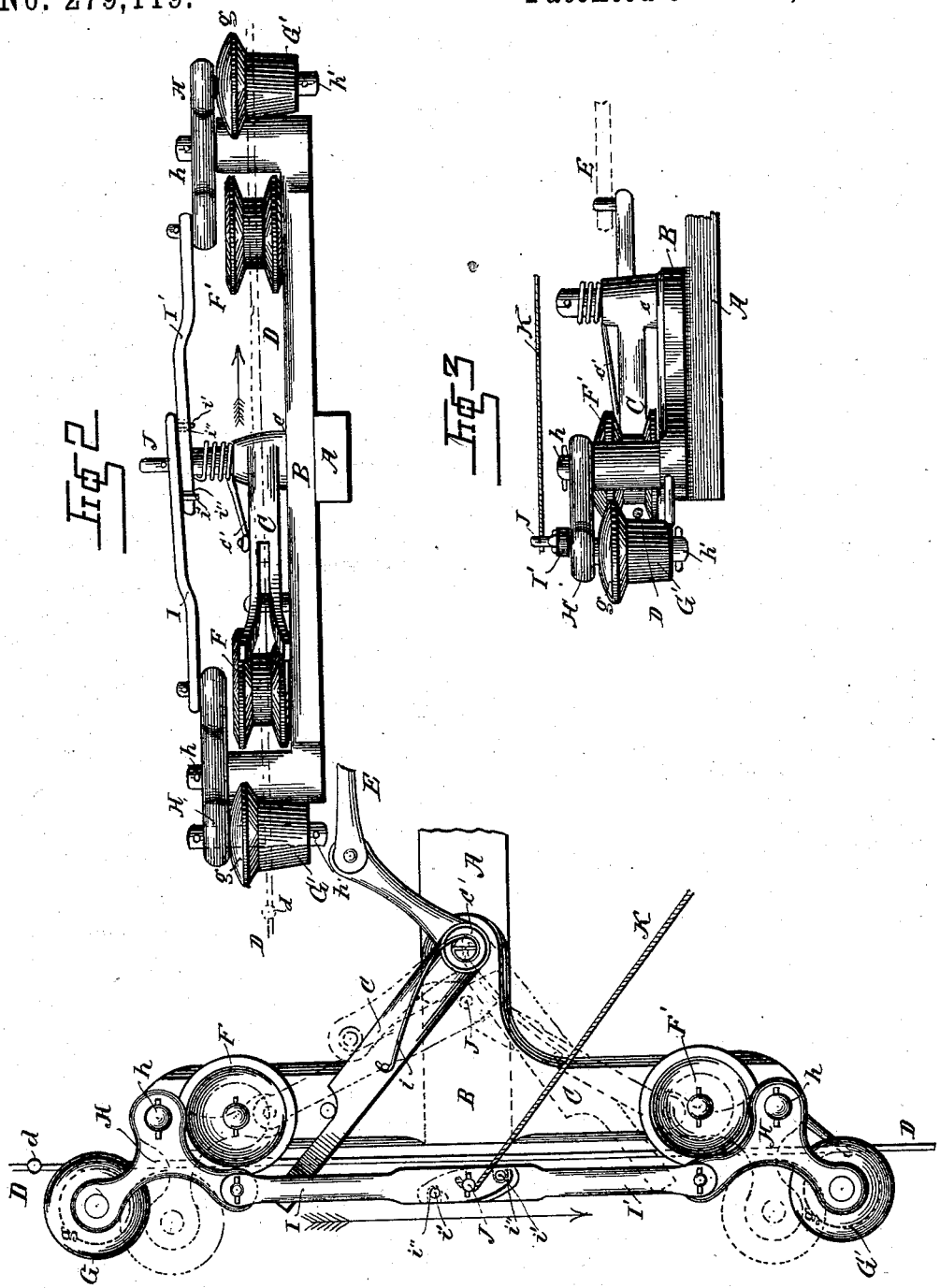
WITNESSES:
Fred. G. Dieterich
Jno. G. Hinkel
INVENTOR.
Monroe Barnes,
By W. B. Richards,
ATTORNEY.

UNITED STATES PATENT OFFICE.

MONROE BARNES, OF BLOOMINGTON, ILLINOIS.

CORN-PLANTER CHECK-ROWER.

SPECIFICATION forming part of Letters Patent No. 279,119, dated June 12, 1883.

Application filed February 9, 1883. (Model.)

*To all whom it may concern:*

Be it known that I, MONROE BARNES, a citizen of the United States, residing at Bloomington, in the county of McLean and State of Illinois, have invented certain new and useful Improvements in Corn-Planter Check-Rowers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to corn-planter check-rowers of that class in which a tappet-wire stretched over the ground to be planted is used for actuating the seed-slides through the instrumentality of a forked lever with which the tappets on the wire come in contact; and the invention relates more especially to that subdivision of this class of check-rowers in which the forked lever swings in a horizontal plane; and the invention consists in a novel manner of hanging and swinging the wire-retaining pulleys, for the purpose of doffing or freeing the wire from the planter.

The invention further consists in a novel means for operating the swinging pulleys, all as hereinafter described.

In the accompanying drawings, which illustrate my invention, and in which the similar letters used as marks of reference apply to the like parts in all the figures. Figure 1 is a top plan. Fig. 2 is a side elevation. Fig. 3 is a rear elevation.

In the drawings I have only shown one set of the devices as used at one end of the ordinary supporting-bar, A, which bar is to be attached transversely on the planter, as usual, and has a similar set of devices at its other end.

Referring to the drawings by letters, B is an ordinary plate, secured to the end of the bar A.

C is an ordinary elbow-shaped lever, journaled or pivoted at $c$, so as to swing in a horizontal plane, and forked at its outer end for the reception of the tappet-wire D, and for the action of the tappets $d$, which are secured thereto. From the inner end of the lever C a rod or link, E, extends to any suitable mechanism for actuating the seed-slides of the planter.

F F' are grooved guide-pulleys, journaled on studs, one near each end of the plate B, and so as to rotate in or about in horizontal planes.

G G' are retaining-pulleys, cylindrical in form, and each with an annular flange, $g$, at its upper end, which flange, however, may be dispensed with.

H H' are elbow-shaped levers, journaled at their bends to studs $h$, which project upwardly from each end of the plate B.

The pulleys G G' are journaled, one to the outer end of each elbow-shaped lever, on studs $h'$, so as to rotate in or about in horizontal planes. A rod, I, is hinged at one end to the inner end of the lever H, and a similar rod, I', is hinged at one end to the lever H'. The adjacent ends of the rods I I' are connected by a pivot bolt or pin, J, at a short distance from the end of each rod. The rod I has downwardly-projecting pins $i'$, one on each side of the pivot J, and the rod I' has slots $i''$ in one side, one on each side of the pivot J, and at same distances from said pivot, respectively, as are the pins $i'$. The pivot-pin J extends above the rods I I', and a cord, K, is secured thereto, which extends to the driver's seat on the planter. When the rods I I' are in positions as shown by full lines in the drawings, the elbow-shaped levers H H' will be held thereby, as shown, in such positions as to bring the pulleys G G' somewhat back past the flanges of the pulleys F F', so that the tappet-wire will be held in the grooves of said pulleys F F' by the retaining-pulleys G G', as shown at Fig. 3, and thereby guided so that the tappets $d$ will properly act on the forked lever C and swing its outer end rearward in the direction of the arrow shown at Fig. 1. The forked lever is returned to its normal position by a spring, $e'$, in the ordinary manner. When the rods I I' are in the positions last described, the pins $i$ will rest in the slots $i''$ and lock the rods I I', so that the pulleys G G' cannot be swung toward each other by any force to which they are subject in use, acting on either or both of said pulleys; but the driver, by drawing on the cord K when the planter reaches the end of the rows, will thereby pull the rods I I', elbow-shaped levers H H', and pulleys G G' into the respective positions shown by dotted lines at Fig. 1, and the pulleys G G', thus drawn away from the pulleys F F', will doff the tappet-wire or free it from the planter without requiring the driver to get off his seat. When the planter is turned around for a new bout, the tappet-wire may be again placed in the grooves in the pulleys F F' and the rods I I' and levers H H' again moved into the positions shown by full lines, to bring the retaining-pulleys G G' into place to keep the tappet-wire in proper working position.

I do not claim herein, broadly, any method of swinging the pulleys G G', which rotate in horizontal planes, away from grooved pulleys F F', which rotate in similar planes, as such invention is the subject of a pending application made jointly by myself with Alden Barnes; but

What I claim, and desire to secure by Letters Patent, is—

1. In a check-rower, in combination with the tappet-wire and elbow-shaped lever, and grooved pulleys F F', journaled on vertical axes, the cylindrical pulleys G G', journaled also on vertical axes carried on elbow-shaped levers H H', which swing in horizontal planes, substantially as and for the purpose specified.

2. In a check-rower, in combination, the tappet-wire, forked lever, grooved pulleys F F', journaled on vertical axes, elbow-levers H H', also journaled on vertical axes, and carrying cylindrical pulleys G G', which swing with said elbow-levers in vertical planes, substantially as and for the purpose specified.

3. In combination with the tappet-wire, forked lever, horizontal rotating pulleys F F', and pulleys G G', carried on elbow-shaped levers H H', the rods I I', pivotally connected to the elbow-shaped levers and to each other, and adapted to actuate said elbow-shaped levers to swing the pulleys G G', substantially as and for the purpose specified.

4. In a check-rower, in combination with the swinging elbow-levers H H', carrying pulleys, the rods I I', pivotally connected to said levers and to each other, and one of them provided with pins $i'$ and the other with slots $i'''$, whereby they may be locked to prevent action on the pulleys moving them, substantially as and for the purpose specified.

5. In combination with the tappet-wire, forked lever, grooved horizontal pulleys, and the cylindrical pulleys carried on swinging elbow-shaped levers, the rods I I', provided with pins $i'$ and slots $i'''$, respectively, by means of which said rods may be locked, substantially as and for the purpose specified.

In testimony whereof I affix my signature in presence of two witnesses.

MONROE BARNES.

Witnesses:
LEWIS E. IJAMS,
ROBERT S. MCINTYRE.